T. M. ADAMS.
STANDING VALVE.
APPLICATION FILED JULY 7, 1917.

1,353,303. Patented Sept. 21, 1920.

INVENTOR.
Thomas M. Adams
BY
Hardaway & Cathey
ATTORNEYS.

UNITED STATES PATENT OFFICE.

THOMAS M. ADAMS, OF HOUSTON, TEXAS.

STANDING VALVE.

1,353,303.  Specification of Letters Patent.  Patented Sept. 21, 1920.

Application filed July 7, 1917. Serial No. 179,140.

*To all whom it may concern:*

Be it known that I, THOMAS M. ADAMS, a citizen of the United States, residing at Houston, in the county of Harris and State of Texas, have invented certain new and useful Improvements in Standing Valves, of which the following is a specification.

This invention relates to new and useful improvements in a standing valve.

The object of the invention is to provide an improved form of standing valve for pumps used in pumping the fluid from oil and water wells.

Another object of the invention resides in the provision of a novel means of securing standing valves in the pipe whereby a water tight joint is formed without the use of leather or fabric rings now commonly employed for this purpose.

A further feature of the invention resides in the provision of a protector which is provided for the purpose of arresting foreign particles and objects which fall down into the pump barrel, from above, and preventing them from passing into the valve cage to interfere with the operation of the valve therein.

A still further feature of the invention resides in the provision of a simple valve composed of few parts which may be easily removed and replaced in case any of the parts become worn or broken.

With the above and other objects in view, the invention has particular relation to certain novel features of construction, operation and arrangement of parts, an example of which is given in this specification and illustrated in the accompanying drawings, wherein:—

Figure 1:
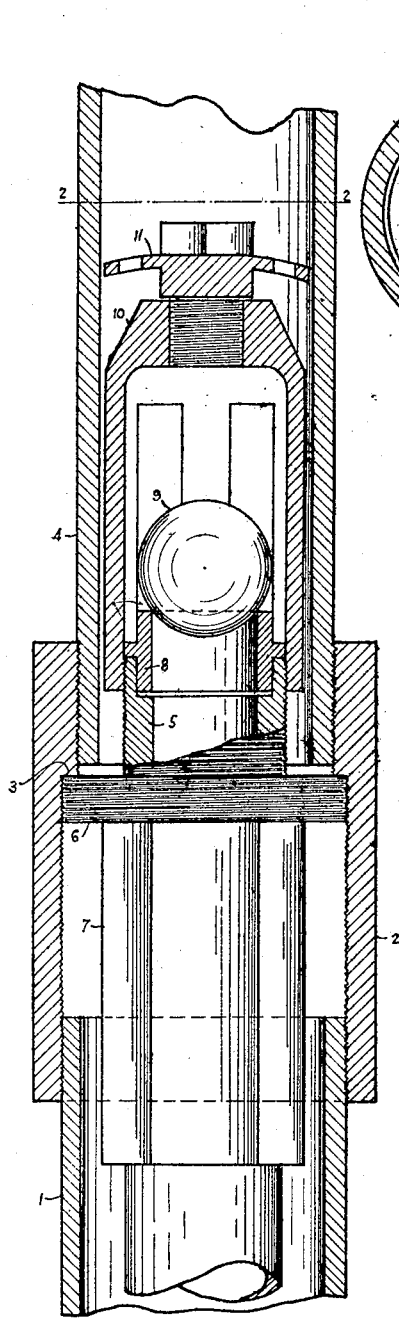
Figure 1 is a vertical sectional view of the device.
Figure 2:
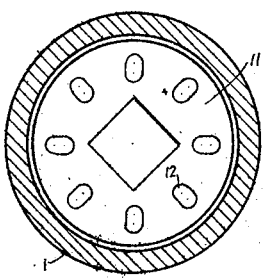
Fig. 2 is a transverse sectional view taken on the line 2—2 of Fig. 1.

Referring now more particularly to the drawings, wherein like numerals of reference designate similar parts in each of the figures, the numeral 1 refers to the pipe which is let down into the well and whose lower end usually carries the strainer or screen employed. Threaded upon the upper end of this pipe is the collar 2 whose upper end is contracted forming an annular shoulder 3 and into the contracted upper end of the collar, the lower end of the standing barrel 4, of the pump is screwed. A nipple 5 is provided having an annular outwardly threaded rib 6 which is screwed into the lower end of the collar 2 until it rests closely against the annular shoulder 3 to form a water tight joint, this form of joint taking the place of the annular cup rings of leather or fabric usually employed for this purpose. Integral with the nipple and below the rib 6 is a polygonal extension 7 provided to receive a wrench by means of which the nipple may be screwed in place or unscrewed. The upper end of the nipple 5 has the usual valve seat 8 controlled by the ball valve 9 and threaded upon the nipple is the usual valve cage 10 which protects the valve and prevents it from displacement from the seat. Carried by the upper end of the cage 10 is the circular disk 11 forming a protector, having a plurality of oblong slots 12 to permit the passage of fluid therethrough and this disk fits closely within the barrel 4 and protects the valve. In the operation of the traveling valve (not shown), which reciprocates in the barrel above the standing valve, in the well known manner, particles of rust, which form in the barrel are loosened by the traveling valve and fall down, unless prevented, into the valve cage and on to the seat and prevent the valve from seating, thus permitting a leak or back flow of fluid upon the down stroke of the traveling valve. Also other particles of foreign matter are liable to fall down into the cage with a like result. For the purpose of protecting the valve against these foreign objects the protector 11 has been provided.

Figure 3:
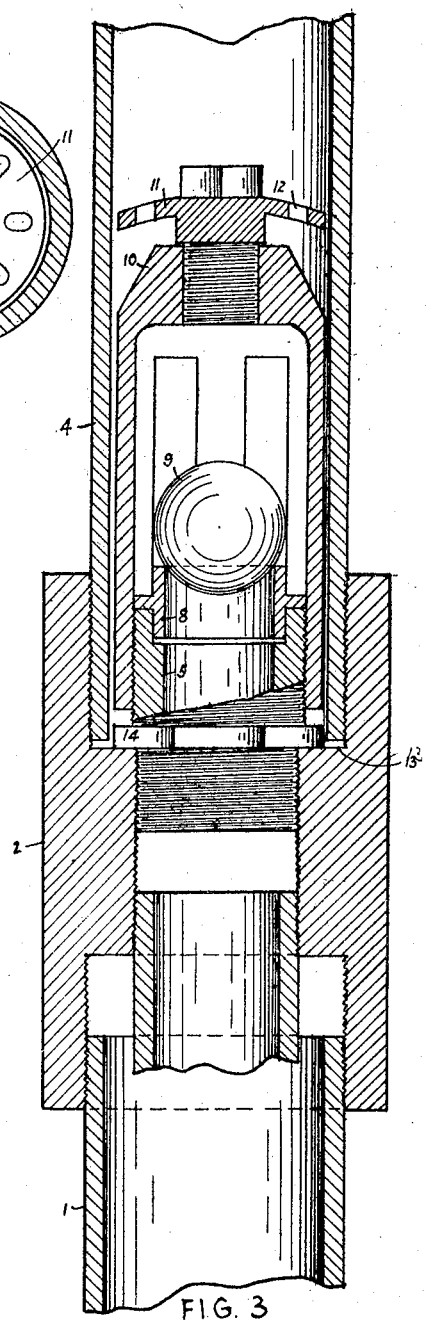
Fig. 3 is a vertical sectional view of a modified form of valve.

In the form shown in Fig. 3, the collar 2 is contracted in the middle forming the annular shoulder 13 and the lower end of the nipple is outwardly threaded and screwed into the contracted portion of the collar 2, said nipple being provided with a polygonal rib 14 which is screwed down against the shoulder 13 so as to form a water tight joint. In other respects, the form shown in Fig. 3 is similar in construction and method of operation to that shown in Fig. 1.

What I claim is:

In a device of the character described, the combination with a pipe, of a collar threaded on the upper end thereof, having an internal annular shoulder, a nipple therein having an outwardly threaded rib which is screwed into the nipple and fits against the said shoulder, forming a water tight joint, a polygonal extension carried by said nipple and provided to receive a wrench, a valve seat carried by the upper end of the nipple, a valve co-acting with said seat, a valve cage protecting the valve and whose upper end has a tapped hole, a pipe threaded into the upper end of the collar and surrounding the cage, and a perforated disk-like protector fitting within said last mentioned pipe, and having a threaded nipple which is adapted to be screwed into said hole.

In testimony whereof I have signed my name to this specification in the presence of two subscribing witnesses.

THOMAS M. ADAMS.

Witnesses:
E. V. HARDWAY,
FLORENCE JOHNSTON.